United States Patent
Park (10) Patent No.: US 7,353,133 B2
(45) Date of Patent: Apr. 1, 2008

(54) TEMPERATURE-BASED CPU OPERATION FREQUENCY CONTROLLER OF A CPU POWERED BY A CPU POWER SUPPLY TO PROTECT AGAINST MULTIPLE CIRCUIT OVERHEATING

(75) Inventor: Seong-geun Park, Yongin (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 649 days.

(21) Appl. No.: 10/460,329

(22) Filed: Jun. 13, 2003

(65) Prior Publication Data

US 2004/0088593 A1   May 6, 2004

(30) Foreign Application Priority Data

Nov. 4, 2002 (KR) .................. 10-2002-0067860

(51) Int. Cl.
  *G01K 7/00* (2006.01)
  *G06F 15/00* (2006.01)
  *G06F 1/00* (2006.01)
(52) U.S. Cl. .................. 702/130; 702/132; 713/300
(58) Field of Classification Search ............. 713/300, 713/320, 322, 501; 702/132, 130; 700/46
See application file for complete search history.

(56) References Cited

U.S. PATENT DOCUMENTS

| | | | |
|---|---|---|---|
| 5,085,526 A * | 2/1992 | Sawtell et al. ............. 374/101 |
| 5,483,635 A * | 1/1996 | Kameyama ................. 714/14 |
| 5,490,059 A * | 2/1996 | Mahalingaiah et al. ....... 700/46 |
| 5,619,430 A | 4/1997 | Nolan et al. |
| 5,664,201 A * | 9/1997 | Ikedea ........................ 713/320 |
| 5,870,267 A * | 2/1999 | Kitano ........................ 361/103 |
| 6,020,820 A * | 2/2000 | Chiang ....................... 340/584 |
| 6,029,251 A * | 2/2000 | Williams et al. ............ 713/501 |

(Continued)

FOREIGN PATENT DOCUMENTS

JP      06187064 A  *  7/1994

(Continued)

OTHER PUBLICATIONS

Dictionary.com, definition of environment, Dictionary.com, pp. 7.*

(Continued)

*Primary Examiner*—Suresh K Suryawanshi
(74) *Attorney, Agent, or Firm*—Staas & Halsey LLP (57) ABSTRACT

A system for protecting against overheating of a CPU whose operation frequency is changed due to voltage variation of a driving power, includes a CPU temperature sensor to detect the temperature of the CPU, a reference temperature sensor to detect the temperature of a circuit block or multiple circuits heated due to the operation frequency of the CPU, a comparing part to output a signal indicating a higher temperature of the temperature of the CPU and the temperature of the circuit block or multiple circuits by comparing temperature values detected by the respective CPU and reference temperature sensors, and a CPU power supply to supply a stepwise decreasing driving power to decrease the operation frequency of the CPU in a stepwise fashion when the temperature value increases based on the signal indicating the higher temperature indicated by the comparing part.

14 Claims, 3 Drawing Sheets

U.S. PATENT DOCUMENTS

| | | | |
|---|---|---|---|
| 6,094,920 A * | 8/2000 | Kawase .................. | 62/3.7 |
| 6,308,121 B1 | 10/2001 | Ulm | |
| 6,463,396 B1 * | 10/2002 | Nishigaki .................. | 702/132 |
| 6,510,400 B1 * | 1/2003 | Moriyama .................. | 702/132 |
| 6,718,474 B1 * | 4/2004 | Somers et al. ............. | 713/322 |
| 6,748,339 B2 * | 6/2004 | Amick et al. ............... | 702/136 |
| 6,888,332 B2 * | 5/2005 | Matsushita ................. | 318/471 |
| 6,928,559 B1 * | 8/2005 | Beard ........................ | 713/300 |
| 6,948,078 B2 * | 9/2005 | Odaohhara ................. | 713/300 |

FOREIGN PATENT DOCUMENTS

| | | |
|---|---|---|
| JP | 10307648 A | 11/1998 |
| JP | 10333789 A | 12/1998 |
| JP | 2002006991 A | 1/2002 |
| KR | 1999-0054393 | 7/1999 |
| KR | 2000-0022601 | 4/2000 |
| KR | 10-0276141 | 9/2000 |
| KR | 2001-0080968 | 8/2001 |
| KR | 2002-0060917 | 7/2002 |
| KR | 2002-0067142 | 8/2002 |
| TW | 414333 | 4/1994 |

OTHER PUBLICATIONS

Office Action dated Apr. 29, 2005 issued by Taiwan Patent Office, corresponds to Patent Application No. 092128390.

* cited by examiner

TEMPERATURE-BASED CPU OPERATION FREQUENCY CONTROLLER OF A CPU POWERED BY A CPU POWER SUPPLY TO PROTECT AGAINST MULTIPLE CIRCUIT OVERHEATING

CROSS-REFERENCE TO RELATED APPLICATIONS

This application claims the benefit of Korean Application No. 2002-67860, filed Nov. 4, 2002, in the Korean Intellectual Property Office, the disclosure of which is incorporated herein by reference.

BACKGROUND OF THE INVENTION

1. Field of the Invention

The present invention relates to a system for protecting against overheating of a CPU, and more particularly, to a system for protecting against overheating of a CPU and enabling an overheating-protecting circuit to solve the problem of overheating of multiple circuits that are easily heated due to frequent operation of the CPU, thus maximizing the operation efficiency of the CPU and also protecting the CPU efficiently against damage.

2. Description of the Related Art

If the driving power necessary for operation is supplied to electrical devices included in a computer system, heat due to an overload applied to the electrical devices and also due to operation of the electrical devices is generated. A CPU, a CPU power supply, a main chipset, and other structural elements of the computer system are especially easily overheated due to frequent operation of the CPU during operation of the system, since the CPU is a core circuit part of the system. Thus, various technologies have been developed to prevent damage of a circuit due to overheating.

Conventionally, tools to protect against overheating are provided in each structural element, and when the device is overheated, the tools output a predetermined signal to the CPU and enable the frequency of operation to be decreased. For example, an over heating protection circuit provided in the CPU power supply decreases the operation frequency of the CPU when the temperature of the CPU power supply exceeds a predetermined reference temperature. An overheating-protection circuit provided in the CPU also decreases the operation frequency of the CPU when the temperature of the CPU exceeds a predetermined reference temperature.

Similarly, all the conventional overheating protection circuits to solve the overheating problem of the core circuit part are operated to solve the overheating by controlling the operation frequency of the CPU. However, each circuit is operated and provided mutually independently, thus decreasing the efficiency in constructing the circuit. Furthermore, each overheating protection circuit controls the operation frequency of the CPU according to respective operation conditions, thus decreasing the operation efficiency of the CPU.

SUMMARY OF THE INVENTION

Accordingly, it is an aspect of the present invention to provide a system for protecting against overheating of a CPU that maximizes an operation efficiency of the CPU and also, that protects against damage of the CPU by enabling one overheating protection circuit to solve the problem of overheating of multiple circuit parts that are easily overheated due to the frequency of operation of the CPU.

Additional aspects and advantages of the invention will be set forth in part in the description which follows and, in part, will be obvious from the description, or may be learned by practice of the invention.

The foregoing and/or other aspects of the present invention are achieved by providing a system for protecting against overheating of a CPU having a frequency of operation that is changed due to a voltage variation of a driving power, comprising a CPU temperature sensor to detect a temperature of the CPU, a reference temperature sensor to detect a temperature of a circuit block that is heated due to the operation frequency of the CPU, a comparing part to compare temperature values detected by CPU temperature sensor and the reference temperature sensor and to output a signal indicating a higher temperature value of the temperature values detected by the respective temperature sensors, and a CPU power supply to supply a stepwise decreasing driving power to decrease the operation frequency of the CPU in a stepwise fashion when the temperature value increases based on the signal indicating the higher temperature value received by the comparing part.

The reference temperature sensor may detect a temperature of the CPU power supply to supply driving power to the CPU. The comparing part then compares the temperature value of the CPU and the temperature value of the CPU power supply detected by the respective temperature sensor and outputs a signal indicating a higher temperature of the temperature value of the CPU and the temperature value of the CPU power supply, respectively.

The CPU power supply may include a quantization circuit to quantize the signal for the temperature value received from the comparing part, a driving power control circuit to control the driving power of the CPU and to decrease the operation frequency of the CPU in a stepwise fashion when the temperature value increases as indicated by the quantized signal indicating an increased temperature value, and a driving power supply circuit to supply the driving power to the CPU in accordance with the control of the driving power control circuit.

The system for protecting the CPU from overheating may further include a microcomputer, hereinafter referred to as a "micom," having an A/D input pin to receive the signal for the higher temperature value indicated by the comparing part when the comparing part compares a temperature of the CPU and a temperature of the CPU power supply, and outputting a driving signal to enable the driving power of the CPU to be decreased in a stepwise fashion when the temperature value increases, in accordance with the temperature value inputted through the A/D input pin to be digitalized. The system may also include a CPU power supply that supplies the driving power to the CPU, which decreases the driving signal received from the micom in a stepwise fashion and also decrease the operation frequency of the CPU in a stepwise fashion when the temperature value increases.

BRIEF DESCRIPTION OF THE DRAWINGS

These and/or other aspects and advantages of the present invention will become apparent and more readily appreciated from the following description of embodiments, taken in conjunction with the accompanying drawings of which.

DETAILED DESCRIPTION OF THE EMBODIMENTS

References will now be made in detail to the present preferred embodiments of the present invention, examples of which are illustrated in the accompanying drawings, wherein like reference numerals refer to the like elements throughout. The embodiments are described below in order to explain the present invention by referring to figures.

Figure 1:
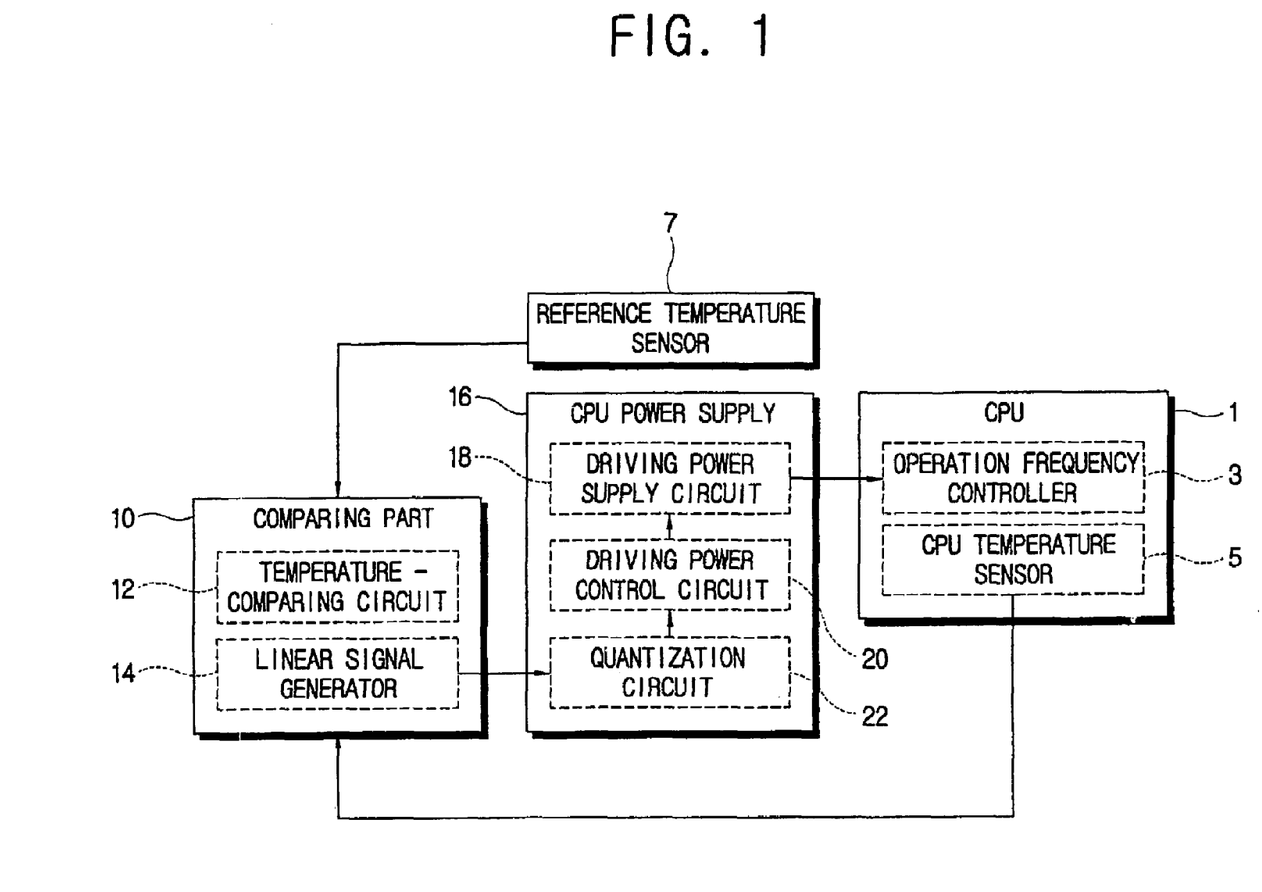
FIG. 1 is a block diagram illustrating control of a system protecting against overheating of a CPU according to an aspect of the present invention.

FIG. 1 is a block diagram illustrating control of a system for protecting against overheating of a CPU according to an aspect of the present invention. As shown in FIG. 1, the system for protecting against overheating of the CPU according to an aspect of the present invention comprises a CPU temperature sensor 5 to detect the temperature of a CPU 1, a reference temperature sensor 7 to detect the temperature of parts (a CPU power supply, main chipset and the like) that are easily overheated on a board, a comparing part 10 to indicate a temperature value as a linear signal by comparing temperature values detected by the respective temperature sensors, a CPU power supply 16 to control a frequency of operation of the CPU 1 in multiple steps based on the linear signal indicating a higher temperature of the temperature values received by the comparing part 10. That is, the comparing part 10 outputs a linear signal based on whichever is higher, the temperature of the CPU 1 or the temperature of the reference temperature sensor 7.

The CPU 1 includes the CPU temperature sensor 5 detecting the CPU temperature and an operation frequency controller 3 to control the operation frequency in accordance with voltage values of a driving power received from the CPU power supply 16.

A temperature-based CPU operation frequency controller of a CPU powered by a CPU power supply may include a CPU temperature sensor 5, a reference temperature sensor 7, and a comparator, which are described in greater detail below. The CPU temperature sensor detects a temperature of the CPU and outputs a first digital signal. The reference temperature sensor 7 detects a temperature of a predetermined circuit block and outputs a second digital signal. The comparing part 10, e.g., a comparator, receives the first and second digital temperature values, respectively, detected by the reference temperature sensor 7 and the CPU temperature sensor 5, and outputs a higher temperature value of the two as a linear signal. The comparing part 10 outputs a control signal to the CPU power supply based on the comparison of the first digital signal and the second digital signal. The control signal controls a driving power provided to the operation frequency controller. In one embodiment, the comparing part 10 outputs a quantized, multi-step control signal to the CPU power supply based on the comparison of the first and second digital signals, so that the control signal controls the driving power provided to the operation frequency controller.

Thus, the comparing part 10 includes a temperature-comparing circuit 12 to determine the higher temperature between a received reference temperature and a received CPU temperature, and a linear signal generator 14 outputs the higher temperature determined by the temperature-comparing circuit 12 as a linear signal. A conventional comparator may be used as the temperature-comparing circuit 12, and since an output signal of the conventional comparator is linear, the linear signal generator 14 may be a part of the structural elements of the temperature-comparing circuit 12.

The CPU power supply 16 supplies, to the CPU 1, a driving power controlling the operation frequency of the CPU 1 in multiple steps, in accordance with a linear signal based on a temperature value received from the comparing part 10. Thus, the CPU power supply 16 includes a quantization circuit 22 that quantizes the linear signal according to the temperature received from the comparing part 10, and a driving power control circuit 20 that controls a driving power of the CPU 1 in accordance with the quantized signal value. Also, a driving power supply circuit 18 supplies the driving power to the CPU 1 in accordance with the control of the driving power control circuit 20.

Herein, the quantization circuit 22 converts a signal of temperature having a linear curve and received from the comparing part 10 to a signal having a definite voltage in accordance with a rate of change for a predetermined interval, thus converting the curve signal to a multi-step signal.

The driving power control circuit 20 that receives a signal from the quantization circuit 22 controls the driving power supply circuit 18 so that the driving power supply circuit 18 supplies the driving power changing the operation frequency of the CPU 1 to a multi-step operation frequency in accordance with the signal of the temperature converted to a multi-step signal.

With the above configuration, a reference temperature and a CPU temperature inputted through the reference temperature sensor 7 and the CPU temperature sensor 5 are inputted into the comparing part 10. The comparing part 10 outputs a signal corresponding to a temperature value of the higher temperature of the two as a linear signal, and the CPU power supply 16 supplies the driving power that changes the operation frequency of the CPU 1 to a multi-step operation frequency in accordance with the temperature value.

Figure 2:
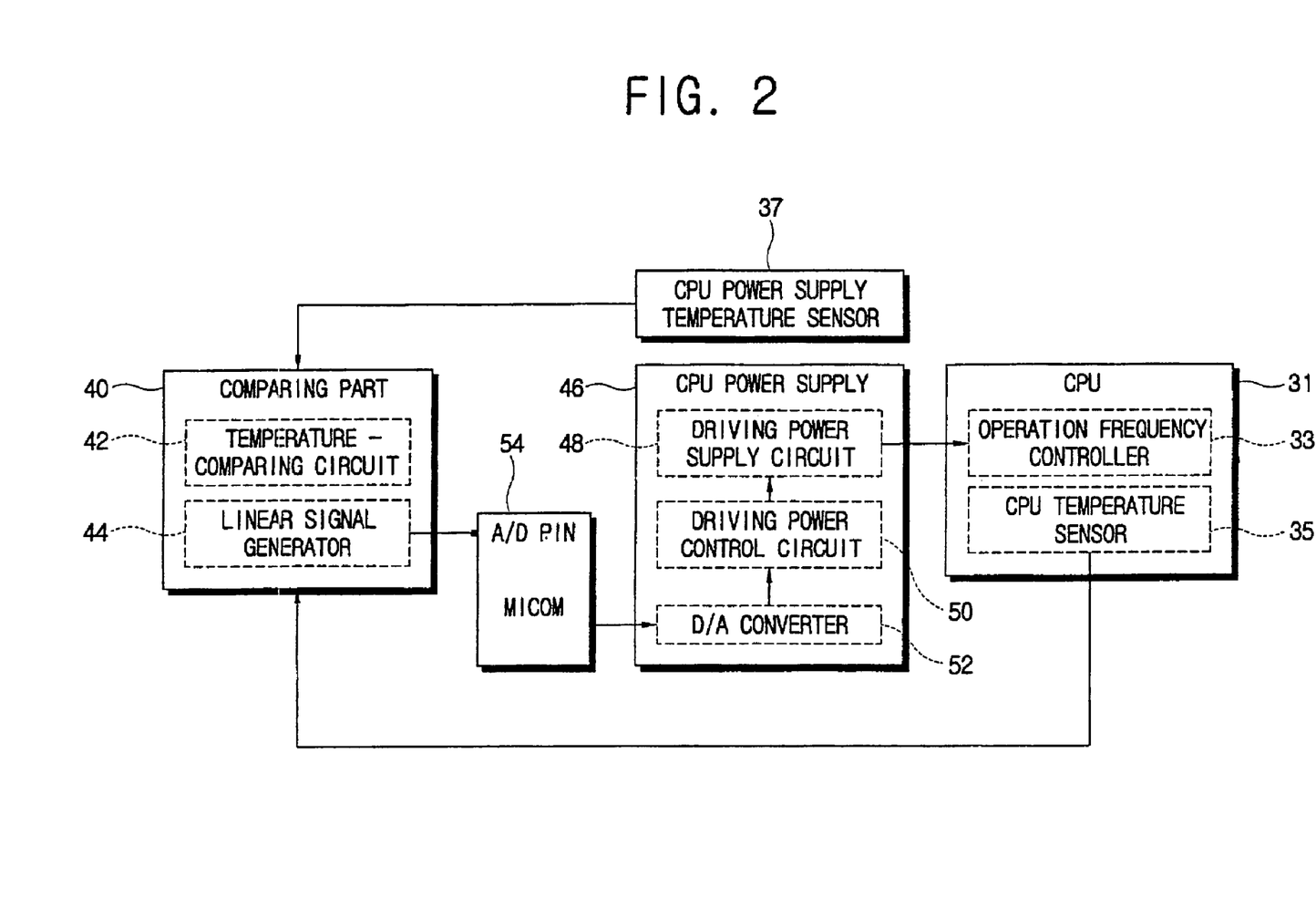
FIG. 2 is a block diagram illustrating control of the system protecting against overheating of a CPU according to another aspect of the present invention.

FIG. 2 is a block diagram illustrating control of a system for protecting against overheating of a CPU according to another aspect of the present invention. FIG. 2 illustrates that the temperature that is compared with the CPU temperature is set up as a temperature of a CPU power supply 46.

As shown in FIG. 2, the present system for protecting against overheating comprises a CPU temperature sensor 35 to detect a temperature of a CPU 31, a CPU power supply temperature sensor 37 to detect the temperature of a CPU power supply 46, a comparing part 40 to output a higher temperature of the temperature of the CPU and the temperature of the CPU power supply temperature as a linear signal by comparing temperature values detected by the respective temperature sensors, a micom 54 to convert the linear signal in accordance with the linear signal of the temperature outputted from the comparing part 40 and converted to a digital signal, and a CPU power supply 46 to control a frequency of operation of the CPU 31 in multiple steps in accordance with the digital signal received from the micom 54.

The CPU 31, as shown in FIG. 1, includes the CPU temperature sensor 35 for detecting the temperature the CPU and an operation frequency controller 33 to control the operation frequency in accordance with the voltage values of driving power received from the CPU power supply 46.

The comparing part 40 receives temperature values respectively detected by the CPU power supply temperature sensor 37 and the CPU temperature sensor 35, and outputs a higher temperature of the CPU power supply temperature sensor and the CPU temperature sensor as a linear signal. Thus, the comparing part 40 includes a temperature-comparing circuit 42 to determine the higher temperature between an inputted temperature of the CPU power supply 46 and the temperature of the CPU 31, and a linear signal generator 44 outputs the higher temperature determined by the temperature-comparing circuit 42 as a linear signal.

The micom 54 receives and digitizes a signal outputted from the comparing part 40 through an A/D input pin, thus converting the signal of the higher temperature value from a linear curve form to a digital value having a multi-step form. The micom 54 signal may be stored as a digital value corresponding to a temperature value of a predetermined interval, indicating the signal of the higher temperature inputted from the comparing part 40. Thus, the micom 54 can convert a temperature value to a digital value, and then supply the digital value to the CPU power supply 46.

The CPU power supply 46 supplies, to the CPU 31, a driving power controlling the operation frequency of the CPU 31 according to a multi-step digitized temperature signal received from the micom 54. Thus, the CPU power supply 46 includes a D/A converter 52 to convert the digitized temperature signal received from the micom 54 to an analog signal, a driving power control circuit 50 to control the driving power of the CPU 31 in accordance with the analog signal of the temperature converted by the D/A converter 52, and a driving power supply circuit 48 to supply the driving power to the CPU 31 in accordance with the control of the driving power control circuit 50.

The driving power control circuit 20 controls the driving power supply circuit 48 so that the driving power supply circuit 48 supplies the driving power that changes the operation frequency of the CPU 31 to a multi-step operation frequency according to the signal of the temperature that is converted to a multi-step signal by the D/A converter 52.

As described in the above embodiment, when a micom is provided and generates a digital signal according to a temperature value to control a driving power, operation frequencies according to respective temperature values may be changed by setting a different digital value corresponding to a temperature value of a predetermined interval.

Figure 3:
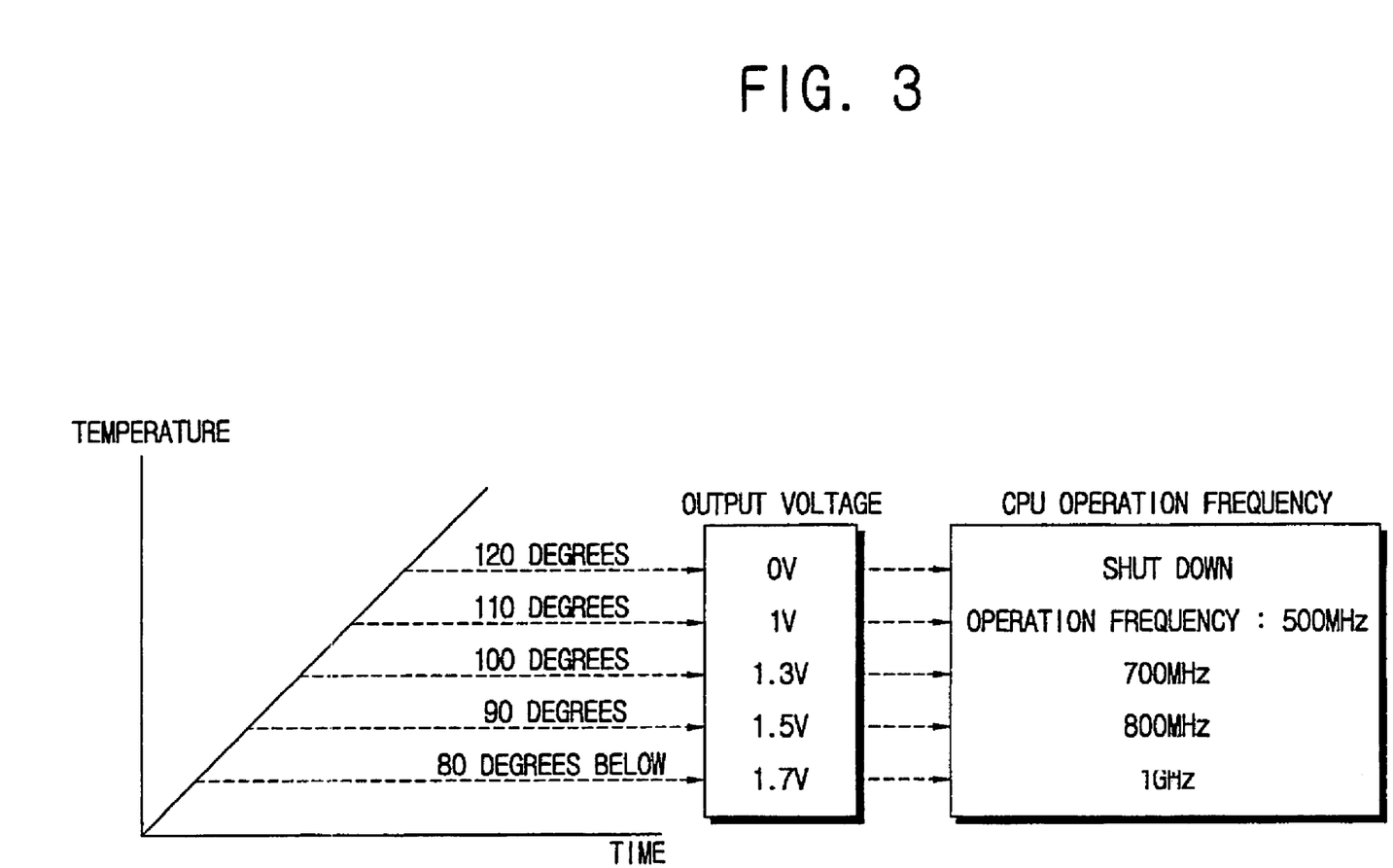
FIG. 3 is a view illustrating a range of heating temperatures and operation frequency of the CPU of the system protecting against overheating of a CPU according to an aspect of the present invention.

FIG. 3 is a view illustrating a range of heating temperatures and a frequency of operation of the CPU of a system for protecting against overheating of a CPU according to an aspect of the present invention. As shown in FIG. 3, when a temperature of a certain part is increased gradually, and thus a detected temperature is less than 80 degrees, a CPU driving power outputted from the CPU power supply 16 and 46 is 1.7 V and an accompanying operation frequency of the CPU 1 and 31 is 1 GHz. When the detected temperature is between 90 degrees and 100 degrees, the CPU driving power outputted from the CPU power supply 16 and 46 is 1.3 V and the accompanying operation frequency of the CPU 1 and 31 is 700 MHz.

The above result can be generated by noting that the operation frequency is varied according to power of a driving power supply in a conventional CPU. However, in the present invention, temperature that varies linearly is quantized or digitalized to have a definite value within a predetermined temperature interval, and thus is converted to a multi-step signal. Thus, a driving power is supplied according to a temperature signal converted to a multi-step signal.

As described above, the present invention enables prevention of overheating of multiple circuits easily heated due to an operation frequency of a CPU by only one overheating-protection circuit, and thus can maximize operation efficiency of the CPU and also protect the CPU from damage efficiently.

As described above, according to the present invention, a system protects against overheating of a CPU, enabling only one overheating-protection circuit to protect against overheating of multiple circuits that are easily heated due to a frequency of operation of the CPU, thus maximizing the operation efficiency of the CPU and also protecting the CPU efficiently from damage.

It is also clear that the present invention may be utilized in a system, controller, method or software, such as a computer-readable medium having stored thereon computer-executable instructions for temperature-based controlling of an operation frequency of a CPU.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A multiple circuit overheating protection system for protecting against overheating of a CPU when an operation frequency is changed in accordance with a voltage variation of driving power, comprising:
   a CPU temperature sensor to detect a temperature of the CPU;
   a reference temperature sensor to detect a temperature of a circuit block heated due to the operation frequency of the CPU;
   a comparing part to output a signal of a higher temperature value obtained by comparing temperature values detected by the CPU temperature sensor and the reference part temperature determining sensor; and
   a CPU power supply to supply a stepwise decreasing driving power to decrease the operation frequency of the CPU in a stepwise fashion when the temperature value increases based on the signal for the higher temperature value outputted from the comparing part to provide overheating protection of the CPU and the circuit block,
   wherein the comparing part comprises:
   a comparing unit, to compare the temperature value of the CPU temperature sensor and the reference part temperature determining sensor to provide a temperature variation signal in accordance with a predetermined scheme; and
   a quantization unit, comprising:
      a micom having an A/D input pin to receive the temperature variation signal outputted from the comparing unit, and outputting a control signal as a digital driving signal; and
   a D/A converter, converting the digital driving signal to an analog driving signal supplied to the CPU power supply to enable the driving voltage power of the CPU to be decreased in a stepwise fashion when a temperature value increases, in accordance with the temperature variation signal.

2. The system for protecting against the overheating of the CPU according to claim 1, wherein:
   the reference part temperature determining sensor detects the temperature of the CPU power supply to supply driving power to the CPU; and
   the comparing part compares the temperature value of the CPU and the temperature value of the CPU power supply detected by the respective CPU and reference part temperature determining sensors, and then outputs a signal indicating a higher temperature value of the temperature value of the CPU and the temperature value of the CPU power supply.

3. The system for protecting against the overheating of the CPU according to claim 1, wherein:
the CPU power supply includes a quantization circuit to quantize the signal for the higher temperature value received from the comparing part;
a driving power control circuit to control a driving power of the CPU to decrease the operation frequency of the CPU in a stepwise fashion when the temperature value increases based on the signal for the variation of the temperature value; and
a driving power supply circuit to supply the driving power to the CPU in accordance with the control of the driving power control circuit.

4. The system for protecting against the overheating of the CPU according to claim 1, further comprising a micom having an A/D input pin to receive the signal for the variation of temperature value outputted from the comparing part, and outputting a driving signal to enable a driving voltage power of the CPU to be decreased in a stepwise fashion when the temperature value increases, in accordance with the temperature value inputted through the A/D input pin to be digitized; and
wherein the CPU power supply supplies to the CPU the driving power in a stepwise decreasing fashion according to the driving signal received from the micom and decreases the operation frequency of the CPU in stepwise fashion.

5. A temperature-based CPU operation frequency controller of a CPU powered by a CPU power supply to protect against multiple circuit overheating, comprising:
a CPU temperature sensor to detect a temperature of the CPU and output a first signal;
a reference temperature sensor to detect a temperature of a predetermined circuit block and output a second signal;
a comparison-quantization unit to determine a higher signal of the first signal and the second signal to provide the higher signal as a temperature signal, and to quantize the temperature signal to output a control signal to the CPU power supply wherein the control signal controls a driving power provided to the operation frequency controller to provide overheating protection of the CPU and the predetermined circuit blocks,
wherein the comparison-quantization unit comprises:
a comparing unit, to compare the first signal and the second signal to provide the temperature variation signal in accordance with the predetermined scheme; and
a quantization unit, comprising:
a micom having an A/D input pin to receive the temperature variation signal outputted from the comparing unit, and outputting a control signal as a digital driving signal; and
a D/A converter, converting the digital driving signal to an analog driving signal supplied to the CPU power supply to enable the driving voltage power of the CPU to be decreased in a stepwise fashion when a temperature value increases, in accordance with the temperature variation signal.

6. The temperature-based CPU operation frequency controller of claim 5, wherein the CPU power supply comprises:

a driving power control circuit to control the driving power of the CPU to decrease the operation frequency of the CPU in a stepwise fashion in accordance with the analog driving signal, and
a driving power supply circuit to supply the driving power to the CPU in accordance with the driving power control circuit. wherein the CPU power supply supplies to the CPU the driving voltage power in a stepwise decreasing fashion in accordance with the analog driving signal received from the D/A converter and decreases the operation frequency of the CPU in the stepwise fashion.

7. A temperature-based CPU operation frequency controller of a CPU powered by a CPU power supply to protect against multiple circuit overheating, comprising:
a CPU temperature sensor to detect a temperature of the CPU and output a first digital signal;
a reference temperature sensor to detect a temperature of a predetermined circuit block and output a second digital signal; and
a comparator to output a control signal to the CPU power supply based on a comparison of the first digital signal and the second digital signal, wherein the control signal controls a driving voltage power provided to the operation frequency controller to provide overheating protection of the CPU and the predetermined circuit blocks,
wherein the comparator comprises:
a comparing unit, to compare the first digital signal and the second digital signal to provide a temperature variation signal in accordance with a predetermined scheme; and
a quantization unit, comprising:
a micom having an A/D input pin to receive the temperature variation signal outputted from the comparing unit, and outputting a control signal as a digital driving signal; and
a D/A converter, converting the digital driving signal to an analog driving signal supplied to the CPU power supply to enable the driving voltage power of the CPU to be decreased in a stepwise fashion when a temperature value increases, in accordance with the temperature variation signal.

8. A computer-readable medium having stored thereon computer executable instructions for temperature-based controlling an operation frequency of a CPU powered by a CPU power supply using a voltage variation of driving voltage power to protect against multiple circuit overheating, comprising:
detecting a temperature of the CPU;
detecting a reference part temperature of a predetermined circuit block;
comparing the temperature of the CPU with the reference part temperature of the predetermined circuit block to determine a temperature variation signal based on the temperature of the CPU with the reference part temperature of the predetermined circuit block; outputting the temperature variation signal and converting the temperature variation signal to a digital driving signal; and
outputting a digital driving signal to control a driving voltage power provided by the CPU power supply to an operation frequency controller of the CPU to enable the driving voltage power of the CPU to be decreased in a stepwise fashion when a temperature value increases, in accordance with the temperature variation signal, to provide overheating protection of the CPU and the predetermined circuit block.

9. The computer-readable medium of claim 7, wherein the control signal outputted is a digital signal.

10. The computer-readable medium of claim 8, wherein the control signal outputted is a multi-step digital signal.

11. The computer-readable medium of claim 8, wherein the control signal outputted is provided to a D/A converter that converts the control signal to an analog control signal, which is then provided to the CPU power supply.

12. A method of temperature-based controlling an operation frequency of a CPU powered by a CPU power supply using a voltage variation of driving voltage power to protect against multiple circuit overheating, comprising:
   detecting a temperature of the CPU;
   detecting a reference temperature of a predetermined circuit block;
   comparing the temperature of the CPU with the reference part temperature of the predetermined circuit block to determine a temperature variation signal based on a higher temperature of the temperature of the CPU and the reference part temperature of the predetermined circuit block;
   utilizing a quantization unit, comprising a micom having an A/D input pin to receive the temperature variation signal outputted from the comparing unit, and outputting a control signal as a digital driving signal; and
   utilizing a D/A converter, to convert the digital driving signal to an analog driving signal supplied to the CPU power supply to enable the driving voltage power of the CPU to be decreased in a stepwise fashion when a temperature value increases, in accordance with the temperature variation signal.

13. A temperature-based CPU operation frequency controller of a CPU powered by a CPU power supply to protect against multiple circuit overheating, comprising:
   a CPU temperature sensor to detect a temperature of the CPU and output a first digital signal;
   a reference part temperature determining sensor to detect a temperature of a predetermined circuit block and output a second digital signal; and
   a comparator to output a quantized, multi-step control signal to the CPU power supply based on a comparison of the first digital signal and the second digital signal, wherein the control signal controls a driving power provided to the operation frequency controller to provide overheating protection of the CPU and the circuit blocks,
   wherein the comparator comprises:
   a comparing unit, to compare the first signal and the second signal to provide a temperature variation signal in accordance with a predetermined scheme; and
   a quantization unit, comprising:
      a micom having an A/D input pin to receive the temperature variation signal outputted from the comparing unit, and outputting a control signal as a digital driving signal;
      a D/A converter, converting the digital driving signal to an analog driving signal supplied to the CPU power supply to enable the driving voltage power of the CPU to be decreased in a stepwise fashion when a temperature value increases, in accordance with the temperature variation signal.

14. A temperature-based CPU operation frequency controller of a CPU powered by a CPU power supply to protect against multiple circuit overheating, comprising:
   a first sensor to detect a temperature of the CPU;
   a second sensor to detect a temperature of a predetermined circuit block; and
   a comparator to output a quantized voltage to the CPU power supply based on a higher temperature of the temperature of the CPU and the temperature of the predetermined circuit block to adjust the CPU operation frequency controller to provide overheating protection of the CPU and the circuit block,
   wherein the comparator comprises:
   a comparing unit, to compare the temperature of the CPU and the temperature of the predetermined circuit block to provide a temperature variation signal in accordance with a predetermined scheme; and
   a quantization unit, comprising:
      utilizing a quantization unit, comprising a micom having an A/D input pin to receive the temperature variation signal outputted from the comparing unit, and outputting a control signal as a digital driving signal; and
      utilizing a D/A converter, to convert the digital driving signal to an analog driving signal supplied to the CPU power supply to enable the driving voltage power of the CPU to be decreased in a stepwise fashion when a temperature value increases, in accordance with the temperature variation signal.

* * * * *

UNITED STATES PATENT AND TRADEMARK OFFICE
CERTIFICATE OF CORRECTION

PATENT NO.         : 7,353,133 B2
APPLICATION NO. : 10/460329
DATED                 : April 1, 2008
INVENTOR(S)       : Seong-geun Park It is certified that error appears in the above-identified patent and that said Letters Patent is hereby corrected as shown below:

Column 6, Line 27, after "driving" insert --voltage--.

Column 6, Line 30, after "reference" insert --part--.

Column 6, Line 30, before "sensor" insert --determining--.

Column 6, Line 38, after "driving" insert --voltage--.

Column 6, Line 65, after "driving" insert --voltage--.

Column 7, Line 11, after "control a driving" insert --voltage--.

Column 7, Line 16, after "supply the driving" insert --voltage--.

Column 7, Line 29, after "driving" insert --voltage--.

Column 7, Line 38, after "reference" insert --part--.

Column 7, Line 38, before "sensor to detect" insert --determining--.

Column 7, Line 46, after "driving" insert --voltage--.

Column 7, Line 49, change "blocks," to --block,--.

Column 8, Line 1, after "control the driving" insert --voltage--.

Column 8, Line 5, after "supply the driving" insert --voltage--.

UNITED STATES PATENT AND TRADEMARK OFFICE
CERTIFICATE OF CORRECTION

PATENT NO.        : 7,353,133 B2
APPLICATION NO.   : 10/460329
DATED             : April 1, 2008
INVENTOR(S)       : Seong-geun Park It is certified that error appears in the above-identified patent and that said Letters Patent is hereby corrected as shown below:

Column 8, Line 7, after "circuit" delete ".".

Column 8, Line 18, after "reference" insert --part--.

Column 8, Line 18, before "sensor to detect" insert --determining--.

Column 8, Line 27, change "blocks," to --block,--.

Column 9, Line 16, after "reference" insert --part--.

Column 9, Line 45, after "driving" insert --voltage--.

Column 9, Line 48, change "blocks," to --block,--.

Signed and Sealed this

Twelfth Day of August, 2008

JON W. DUDAS
*Director of the United States Patent and Trademark Office*